United States Patent
Ghaseminejad

(12) 
(10) Patent No.: US 6,407,402 B1
(45) Date of Patent: Jun. 18, 2002

(54) I2C OPTO-ISOLATOR CIRCUIT

(75) Inventor: Parviz Ghaseminejad, Framingham, MA (US)

(73) Assignee: PowerSmart, Inc., Needham, MA (US)

( * ) Notice: Subject to any disclaimer, the term of this patent is extended or adjusted under 35 U.S.C. 154(b) by 0 days.

(21) Appl. No.: 09/698,571

(22) Filed: Oct. 27, 2000

Related U.S. Application Data

(60) Provisional application No. 60/162,314, filed on Oct. 28, 1999.

(51) Int. Cl.[7] .......................... H01L 31/00; G02B 27/00; H04B 10/00
(52) U.S. Cl. .................... 250/551; 250/214 R; 327/514
(58) Field of Search ................................ 250/551, 229, 250/214 R; 327/298, 318, 409, 514, 515; 257/82, 83, 84, 446, 462; 370/438, 537; 340/7.27

(56) References Cited

U.S. PATENT DOCUMENTS

| | | | |
|---|---|---|---|
| 4,282,604 A | | 8/1981 | Jefferson .................... 455/602 |
| 5,007,013 A | * | 4/1991 | Elms .......................... 370/438 |
| 5,323,014 A | | 6/1994 | Liscio et al. ................ 250/551 |
| 5,406,091 A | | 4/1995 | Burba et al. ................ 250/551 |
| 5,438,210 A | | 8/1995 | Worley ........................ 257/82 |
| 5,740,235 A | * | 4/1998 | Lester et al. ............... 340/7.27 |

OTHER PUBLICATIONS

Philips Semiconductors, The I2C–bus and How to Use It (including specifications), Apr., 1995, 24 pages.
Philips Semiconductors, Integrated Circuits Data Sheet, PCF8574 Remote 8-bit I/O Expander for I2C–bus, Apr., 1997, 24 pages.

* cited by examiner

Primary Examiner—John R. Lee
(74) Attorney, Agent, or Firm—McDermott, Will & Emery

(57) ABSTRACT

An opto-isolator circuit for providing isolation between a bi-directional, I2C transmission line and a pair of single-direction transmission lines. The opto-isolator circuit includes a bi-directional port for receiving data from, and providing data to, the bi-directional transmission line. The circuit further includes an output path that has (i) a first buffer for receiving outgoing data from the bi-directional port, (ii) a first opto-isolator for receiving the outgoing data from an output of the first buffer, and (iii) a second buffer for receiving the outgoing data from an output of the first opto-isolator and providing the outgoing data to an output port. The circuit also includes an input path, that has (i) a third buffer for receiving incoming data from an input port, (ii) a second opto-isolator for receiving the incoming data from an output of the third buffer, and (iii) a fourth buffer for receiving the incoming data from an output of the second opto-isolator. The fourth buffer provides the incoming data to the bi-directional port such that characteristics of the incoming data are compatible with I2C characteristics.

8 Claims, 4 Drawing Sheets

I2C OPTO-ISOLATOR CIRCUIT

CROSS-REFERENCE TO RELATED APPLICATIONS

This application claims the benefit of U.S. Provisional Application No. 60/162,314, filed Oct. 28, 1999, the contents of which are incorporated herein by reference in their entirety, and from which priority is claimed.

STATEMENT REGARDING FEDERALLY SPONSORED RESEARCH

Not Applicable

REFERENCE TO MICROFICHE APPENDIX

Not Applicable

BACKGROUND OF THE INVENTION

The present invention relates to circuits for providing electrical isolation and more particularly, to optical isolation circuits (hereinafter referred to as "opto-isolator" circuits), that are compatible with the Inter-Integrated Circuit (referred to hereinafter as "I2C") communication protocol. The I2C bus is a bidirectional, two-wire communication architecture that was developed to provide communications among integrated circuit ("IC") devices, and is well known to those in the art. The I2C protocol is essentially a master/slave system, where a master station broadcasts a request for information, addressed to a particular slave, over a single physical wire. Slave stations continuously monitor the wire for such broadcasts directed to them; when a slave detects that it is being addressed, the slave responds to the request at a predetermined time after the master as finished transmitting. In this way, only one transmitter is using the wire at a time, all under the control and direction of the master station. The standard data rate is 100,000 bits per second, which can be escalated to 400,000 bits per second in the fast mode. There is no particular limit to the number of devices that can be connected to the I2C bus, as long as the maximum bus capacitance of 400 pF is not exceeded.

FIG. 1 shows a battery monitoring application in which the I2C bus may be used. In this application, a large number of individual cell modules 20 (e.g., 30 or more modules) are connected in series to form a high voltage battery 10. Each of the cell modules 20 includes a voltage cell 22, along with a power monitor module 24 associated with the cell 22. In one embodiment, the cell includes a NiMH cell, although other technologies for generating voltage known to those in the art may also be used.

The power monitor module 24 determines various parameters of the associated cell 22 and reports those parameters via an I2C bus 30. Each module provides a data input/output ("I/O") port 32, a clock I/O port 34, and a local ground 36. The data I/O 32 and the clock I/O 34 are referenced to the local ground 36. Thus, in the embodiment shown in FIG. 1, a large number of individual cell modules 20, all connected at different voltage levels, provide information about the constituent cells. Because the cell modules 20 are stacked, i.e., connected in series, a differential voltage exists between the output signals of the modules. As an example, assume that each cell 22 produces 10.8 VDC, and the battery 10 includes 30 such cells. Thus, the voltage differential between the cell module 20 at the top of the series and the cell module 20 at the bottom of the series is 324 volts.

A battery monitor module 40 communicates with the individual modules 20 via an I2C bus 42. However, since the individual modules 20 all operate at different voltage levels, the data 32 and clock 34 outputs cannot be commonly connected. Accordingly, the data 32 and clock 34 outputs can only be tied to a common bus after they have been isolated from one another via an isolation device 50 as shown in FIG. 1. One prior art device used to provide isolation between circuits that operate at different voltage levels is an opto-isolator. However, prior-art opto-isolator circuits can not accommodate the unique characteristics of the I2C communications protocol.

It is an object of the present invention to substantially overcome the above-identified disadvantages and drawbacks of the prior art.

SUMMARY OF THE INVENTION

The foregoing and other objects are achieved by the invention which in one aspect comprises an opto-isolator circuit for providing isolation between a bidirectional, I2C transmission line and a pair of single-direction transmission lines. The opto-isolator circuit includes a bi-directional port for receiving data from, and providing data to, the bi-directional transmission line. The circuit further includes an output path that has (i) a first buffer for receiving outgoing data from the bi-directional port, (ii) a first opto-isolator for receiving the outgoing data from an output of the first buffer, and (iii) a second buffer for receiving the outgoing data from an output of the first opto-isolator and providing the outgoing data to an output port. The circuit also includes an input path, that has (i) a third buffer for receiving incoming data from an input port, (ii) a second opto-isolator for receiving the incoming data from an output of the third buffer, and (iii) a fourth buffer for receiving the incoming data from an output of the second opto-isolator. The fourth buffer provides the incoming data to the bi-directional port such that characteristics of the incoming data are compatible with I2C characteristics.

In another embodiment of the invention, the bidirectional port is at a voltage level corresponding to a logic high when a voltage level corresponding to a logic high is applied to the input port, and the bi-directional port is at a voltage level corresponding to a logic low when a voltage level corresponding to a logic low is applied to the input port.

In another embodiment of the invention, the output port is at a voltage level corresponding to a logic high when a voltage level corresponding to a logic high is applied to the bi-directional port, and the output port is at a voltage level corresponding to a logic low when a voltage level corresponding to a logic low is applied to the bi-directional port.

In another embodiment of the invention, the first buffer includes a tri-state buffer having (i) a high-impedance enable input electrically coupled to the bi-directional port, (ii) an output electrically coupled to the first opto-isolator, and (iii) an input electrically coupled to a reference voltage corresponding to a logic high state.

In another embodiment of the invention, the second buffer includes a tri-state buffer constructed and arranged such that the output of the tri-state buffer is in a high-impedance state when the first opto-isolator presents a voltage corresponding to a logic high state to the input of the second buffer. The output of the tri-state buffer is at a voltage level corresponding to a logic low state when the first opto-isolator presents a high impedance state to the input of the second buffer, and the output of the tri-state buffer is electrically coupled to the output port.

In another embodiment of the invention, the third buffer includes a tri-state buffer having (i) a high-impedance enable input electrically coupled to the input port, (ii) an output electrically coupled to the second opto-isolator, and (iii) an input electrically coupled to a reference voltage corresponding to a logic high state.

In another embodiment of the invention, the fourth buffer includes a tri-state buffer constructed and arranged such that its output is at a voltage level corresponding to a logic high when the second opto-isolator presents a voltage corresponding to a logic high state to the input of the fourth buffer. The output of the tri-state buffer is at a voltage level corresponding to a logic low state when the first opto-isolator presents a high impedance state to the input of the fourth buffer, and the output of the tri-state buffer is electrically coupled to the bi-directional port.

In another aspect, the invention includes a method of providing isolation between a bi-directional, I2C transmission line and a pair of single-direction transmission lines. The method includes providing a bidirectional port for receiving data from, and providing data to, the bi-directional transmission line. The method further includes providing an output path, including (i) a first buffer for receiving outgoing data from the bi-directional port, (ii) a first opto-isolator for receiving the outgoing data from an output of the first buffer, and (iii) a second buffer for receiving the outgoing data from an output of the first opto-isolator and providing the outgoing data to an output port. The method also includes providing an input path, including (i) a third buffer for receiving incoming data from an input port, (ii) a second opto-isolator for receiving the incoming data from an output of the third buffer, and (iii) a fourth buffer for receiving the incoming data from an output of the second opto-isolator. The fourth buffer provides the incoming data to the bi-directional port such that characteristics of the incoming data are compatible with I2C characteristics.

BRIEF DESCRIPTION OF DRAWINGS

The foregoing and other objects of this invention, the various features thereof, as well as the invention itself, may be more fully understood from the following description, when read together with the accompanying drawings in which.

DESCRIPTION OF THE PREFERRED EMBODIMENTS

Figure 1:
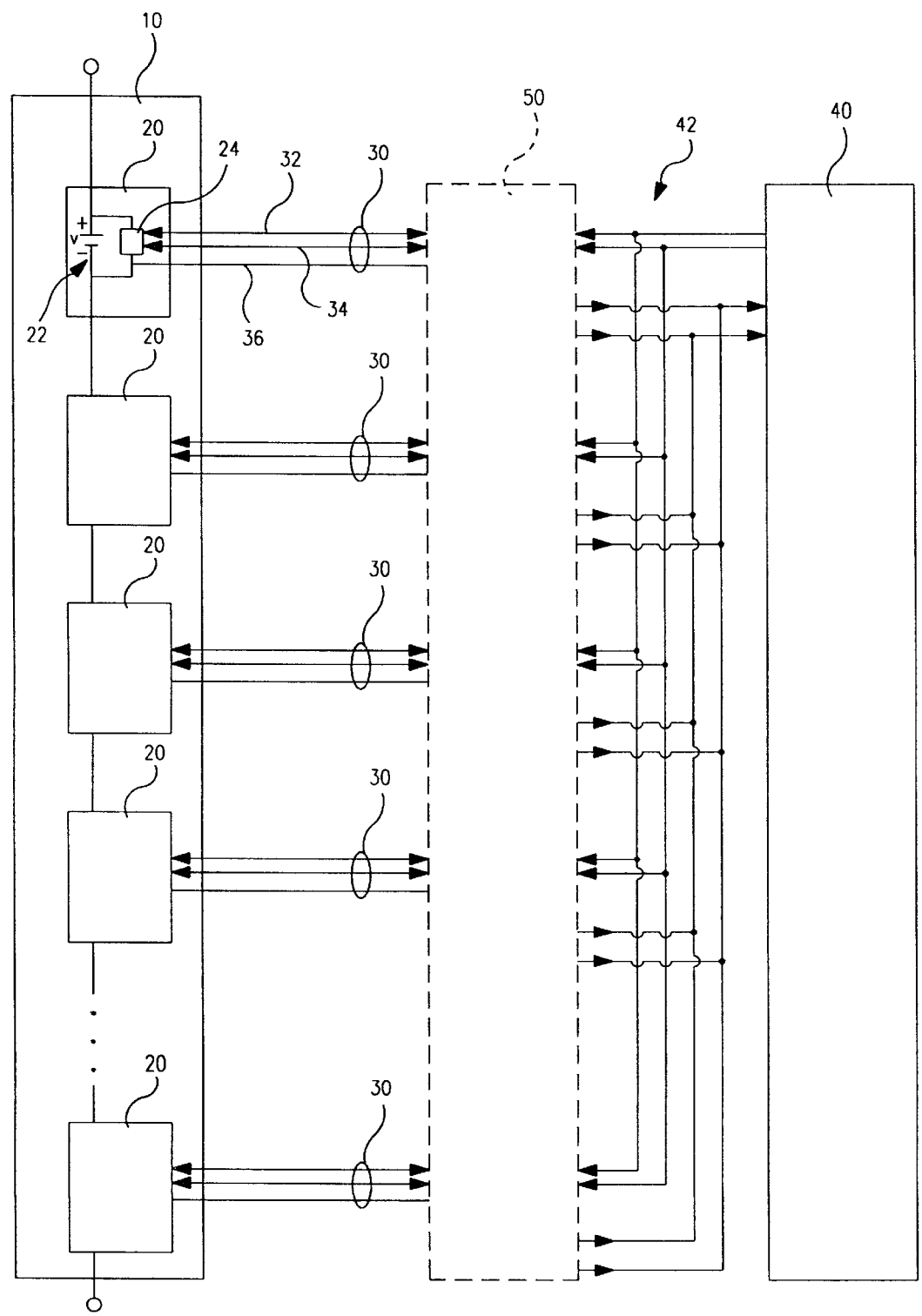
FIG. 1 shows a battery monitoring application in which the I2C bus may be used.
Figure 2:
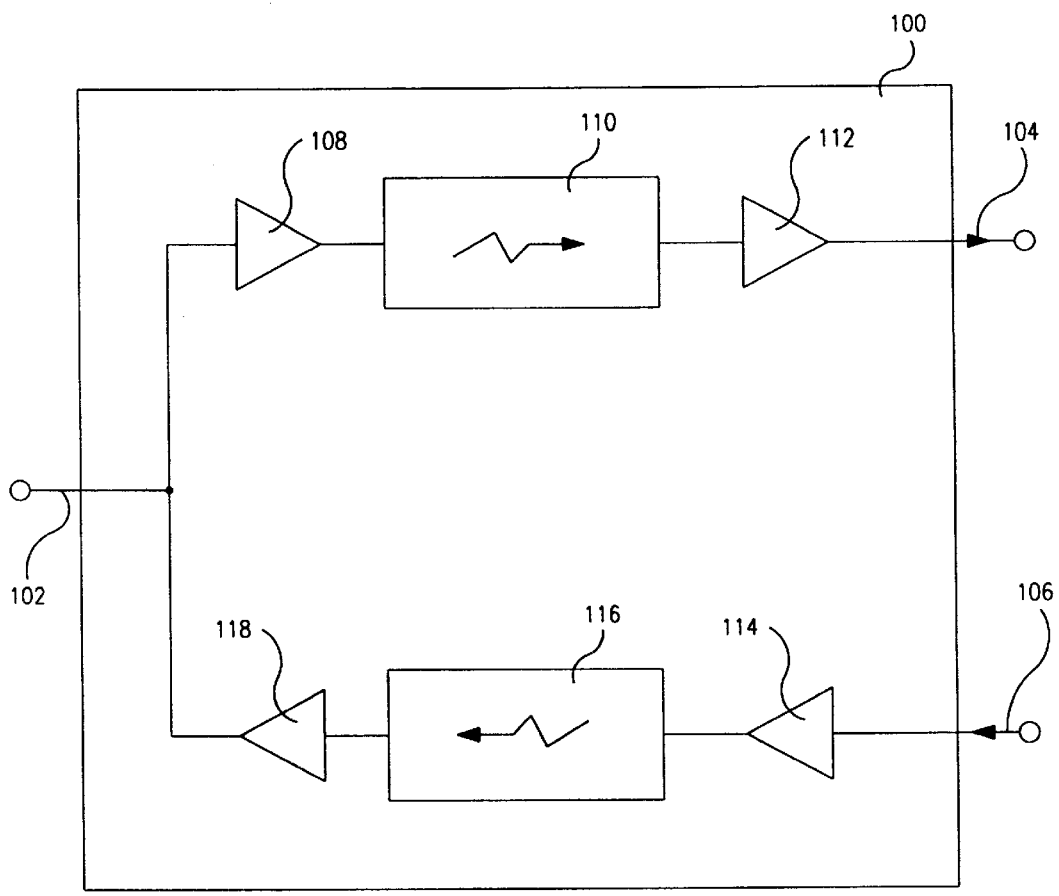
FIG. 2 shows a block diagram view of one preferred embodiment of an I2C opto-isolator circuit according to the present invention.
Figure 3:
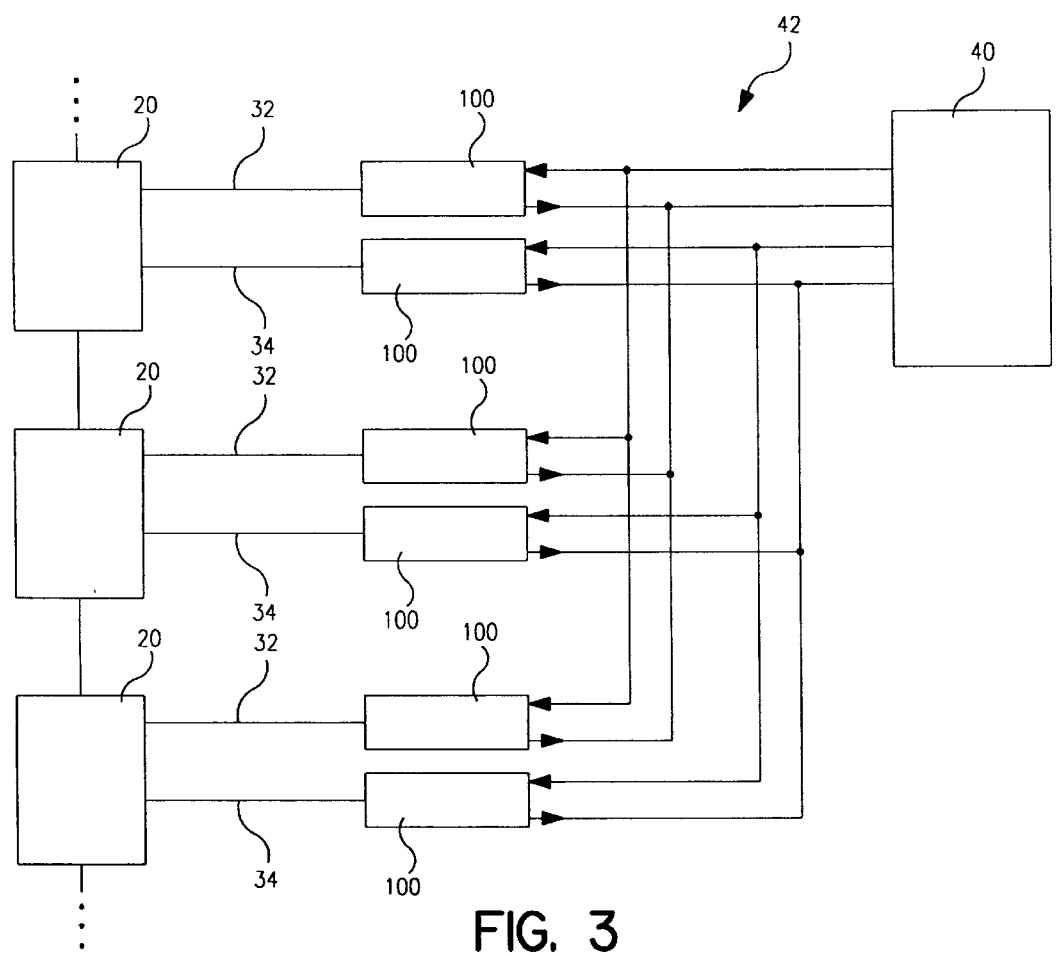
FIG. 3 shows the distribution of opto-isolator circuits to clock and data lines for three different cells in the circuit of FIG. 2; and, FIG. 4 shows a schematic representation of one preferred embodiment of the opto-isolator circuit of FIG. 2.

FIG. 2 shows a block diagram view of one preferred embodiment of an I2C opto-isolator circuit 100 according to the present invention. Each clock I/O 32 and data I/O 34 from the battery 10 is connected to a separate opto-isolator circuit. FIG. 3 shows the distribution of opto-isolator circuits 100 to clock and data lines for three different cells 20.

In FIG. 2, the opto-isolator 100 includes a bidirectional port 102, an output port 104 and an input port 106. The opto-isolator 100 operates in one of three modes. In a first mode, the opto-isolator 100 receives an input signal at the bi-directional port 102, transmits the signal through the opto-isolator 100, and drives the signal out of the output port 104. In a second mode, the opto-isolator 100 receives an input signal at the input port 106, transmits the signal through the opto-isolator 100, and drives the signal out of the bi-directional port 102. In a third mode, the opto-isolator 102 is inactive, and all ports 102, 104 and 106 are in a predetermined inactive state. In one preferred embodiment, the predetermined inactive state is logic high. In some preferred embodiments of the invention, the signals driven in and out of the ports 102, 104 and 106 are digital logic signals, although in other embodiments the signals could be analog signals, or other forms of signals known in the art.

When the opto-isolator circuit 100 is operating in the first mode, a first buffer 108 receives a signal the bi-directional port 102 and drives it into a first opto-isolator 110. In one embodiment, this first opto-isolator 108 is a light emitting diode ("LED") and phototransistor combination that is well known to those in the art. Within such an opto-isolator, the LED transforms an electrical signal into a light signal, and transmits the light signal to the phototransistor. The phototransistor receives the light signal, transforms it back into an electrical signal, and provides the recovered electrical signal at an output of the opto-isolator. Such an opto-isolator thus provides isolation to the extent of the gap between the LED and the phototransistor. Other such devices that provide isolation by transforming an electrical signal to some other form and then back into an electrical signal again, or by another method of providing isolation known in the art, may also be used. One example of a commercially available opto-isolator such as the one described herein is a PS2501 manufactured by NEC. A second buffer 112 receives the output signal from the first opto-isolator 110 and drives the signal to the output port 104.

When the opto-isolator circuit 100 is operating in the second mode, a third buffer 114 receives a signal on the input port 106 and drives it into a second opto-isolator 116, which has similar characteristics to the first opto-isolator 110. A fourth buffer 118 receives the output signal from the second opto-isolator 116 and drives the signal to the bi-directional port 102.

When there is no input signal at either the bi-directional port 102 or the input port 106, the opto-isolator circuit 100 is operating in the third mode, also referred to herein as the "idle" mode. When the opto-isolator circuit 100 detects the absence of an input signal at either the bi-directional port 102 or the input port 106, the opto-isolator circuit 100 drives the bi-directional port 102 and the output port 104 to a predetermined "idle" level. In one preferred embodiment, the idle level is a voltage level that corresponds to a logic high (depending upon the particular logic family being used), although other predetermined levels may also be used to represent an idle state.

Figure 4:
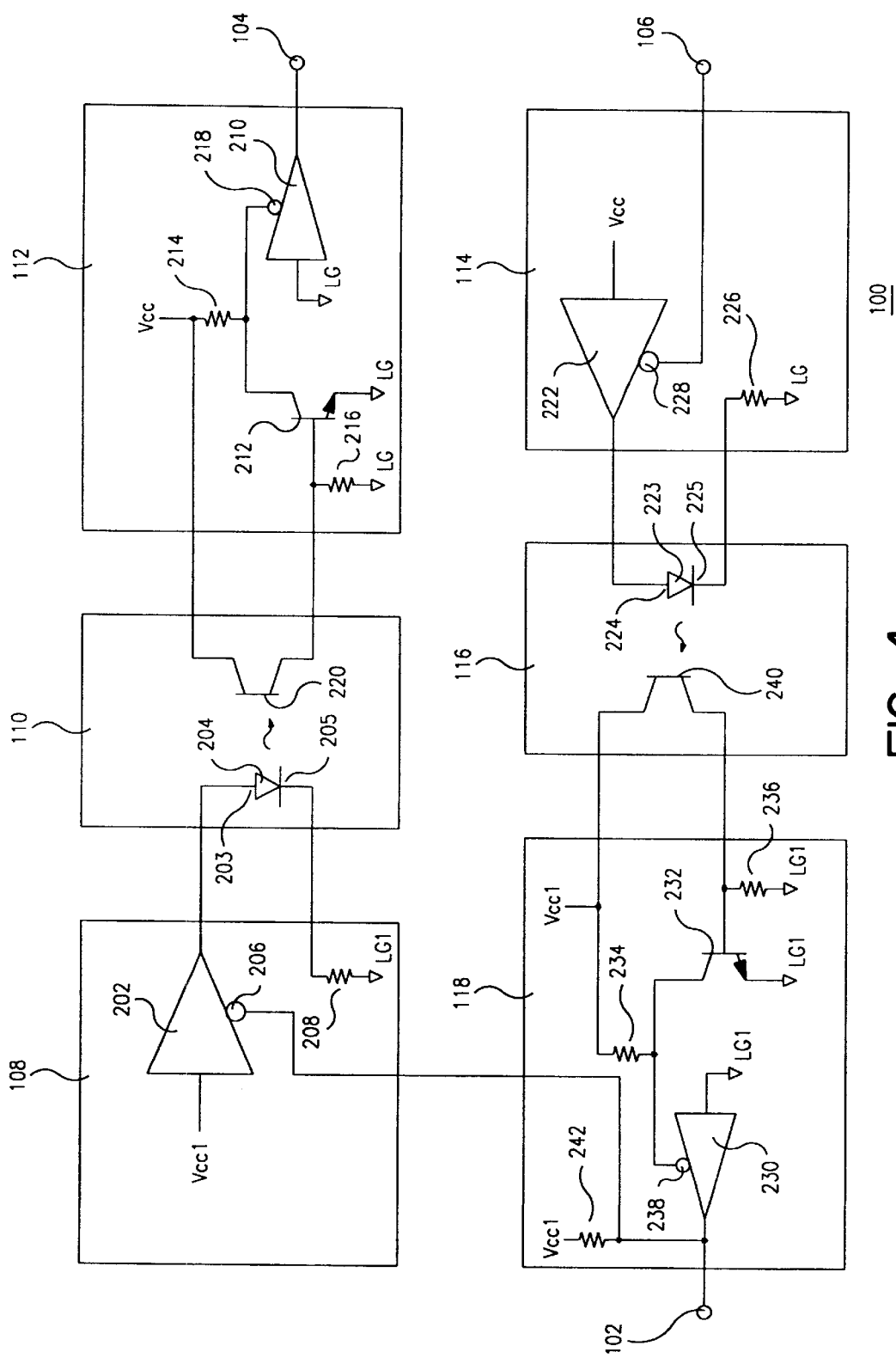

FIG. 4 shows a schematic representation of one preferred embodiment of the opto-isolator circuit 100. The first buffer 108 includes a driver circuit 202 with a tri-state output. The output of the driver circuit can therefore be either a logic high, a logic low, or a state of high-impedance. The input of the driver circuit 202 is electrically coupled to a reference voltage $V_{CC1}$ that preferably corresponds to a logic high, and the output of the driver circuit 202 is electrically coupled to the anode 203 of an LED 204 in the opto-isolator 110. The high-impedance enable input 206 is electrically coupled to the bi-directional port 102. The cathode 205 of the LED 204 is electrically coupled to a terminal of a resistor 208. The other terminal of the resistor 208 is electrically coupled to local ground-1 ("LG1"), where "LG1" is defined as a reference voltage of zero volts with respect to $V_{CC1}$.

The second buffer 112 includes a driver circuit 210 with a ti-state output, an NPN bipolar transistor 212, a pull-up resistor 214, and a pull-down resistor 216. The input of the driver 210 is electrically coupled to local ground ("LG"), where "LG" is defined as a reference voltage of zero volts with respect to the reference voltage $V_{CC}$, and the output of the driver 210 is electrically coupled to the output port 104. The high-impedance enable 218 is electrically coupled to the collector of the transistor 212 and to a first terminal of the pull-up resistor 214. The second terminal of the pull-up resistor is electrically coupled to $V_{CC}$. The base of the transistor 212 is electrically coupled to a first terminal of the pull-down resistor 216 and to a first terminal of a phototransistor 220 in the opto-isolator 110. A second terminal of the pull-down resistor 216 is electrically coupled to LG, a second terminal of the phototransistor 220 is electrically coupled to $V_{CC}$, and the emitter of the transistor 212 is electrically coupled to LG.

The third buffer 114 includes a driver circuit 222 with a tri-state output. The input of the driver circuit 222 is electrically coupled to a reference voltage $V_{CC}$ that preferably corresponds to a logic high, and the output of the driver circuit 222 is electrically coupled to the anode 223 of an LED 224 in the opto-isolator 116. The high-impedance enable input 228 is electrically coupled to the input port 106. The cathode 225 of the LED 224 is electrically coupled to a terminal of a resistor 226. The other terminal of the resistor 226 is electrically coupled to LG.

The fourth buffer 118 includes a driver circuit 230 with a tri-state output, an NPN bipolar transistor 232, a pull-up resistor 234, and a pull-down resistor 236. The input of the driver 230 is electrically coupled to LG1, and the output of the driver 230 is electrically coupled to the bi-directional port 102. The high-impedance enable 238 is electrically coupled to the collector of the transistor 232 and to a first terminal of the pull-up resistor 234. The second terminal of the pull-up resistor 234 is electrically coupled to $V_{CC1}$. The base of the transistor 232 is electrically coupled to a first terminal of the pull-down resistor 236 and to a first terminal of a phototransistor 240 in the opto-isolator 116. A second terminal of the pull-down resistor 236 is electrically coupled to LG1, a second terminal of the phototransistor 240 is electrically coupled to $V_{CC1}$, and the emitter of the transistor 212 is electrically coupled to LG1. A first terminal of a second pull-up resistor 242 is electrically coupled to the bi-directional port 102. A second terminal of the second pull up resistor 242 is electrically coupled to $V_{CC1}$.

In the first mode, where digital data enters the bi-directional port 102 and exits the output port 104, a logic low level causes a voltage drop across the pull-up resistor 242, and enables the high impedance state of the buffer 202. While in the high-impedance state, no current flows through the LED 204, and the phototransistor 220 remains off. While the phototransistor 220 remains off, the transistor 212 also remains off, resulting in a negligable voltage drop across the pull up resistor 214, which in turn keeps the high-impedance enable 218 of driver circuit 210 in the inactive state (logic high), enabling the driver 210. The enabled driver 210 drives the LG (logic low) at its input to the output port 104. Thus, in the first mode, a logic low at the bi-directional port 102 results in a logic low at the output port 104.

In the first mode, a logic high level at bi-directional input 102 causes a negligable voltage drop across the pull-up resistor 242 and places the high-impedance enable 206 of the driver 202 in its inactive state, thus enabling the driver 202. The enabled driver 202 drives the VCC1 at its input to the anode 203 of the LED 204, thus forward biasing the LED 204 and causing it to emit light. The emitted light turns on the phototransistor 220, which turns on the transistor 212. The transistor 212 being on creates a voltage drop across the pull-up resistor 214 that is large enough to place the high-impedance enable 218 in the active state, placing the output of the driver 210 in the high-impedance state. Thus, in the first mode, a logic high at the input of the bi-directional port results in a high impedance state at the output port 104. An external pull-up resistor on the output port would thus produce a logic high.

In the second mode, where digital data enters the input port 106 and exits the bi-directional port 102, a logic low level enables the high impedance state of the buffer 222. While the buffer 222 is in the high-impedance state, no current flows through the LED 224, and the phototransistor 240 remains off. While the phototransistor 240 remains off, the transistor 232 also remains off, resulting in a negligable voltage drop across the pull up resistor 234, which in turn keeps the high-impedance enable 238 of driver circuit 230 in the inactive state (logic high), enabling the driver 230. The enabled driver 230 drives the LG (logic low) at its input to the bi-directional port 102. Thus, in the second mode, a logic low at the input port 106 results in a logic low at the bi-directional port 102.

In the second mode, a logic high level at the input port 106 places the high-impedance enable 206 of the driver 202 in the inactive state, thus enabling the driver 222. The enabled driver 222 drives the $V_{CC1}$ at its input to the anode 223 of the LED 224, thus forward biasing the LED 224 and causing it to emit light. The emitted light turns on the phototransistor 240, which turns on the transistor 232. The transistor 232 being on creates a voltage drop across the pull-up resistor 234 that is large enough to place the high-impedance enable 238 in the active state, placing the output of the driver 210 in the high-impedance state. The pull-up resistor 242 brings the high-impedance output of the driver 210 to a logic high state. Thus, in the second mode, a logic high at the input port 106 results in a logic high state at the bi-directional port 102.

In the third mode (i.e., the idle state), a logic high state is present at the bi-directional port 102 and the input port 106 (i.e., the idle state), indicative of no data at either port. As described above, a logic high at the bi-directional port results in a high-impedance state at the output port 104, and a logic high at the input port 106 results in a logic high at the bi-directional port 102.

The invention may be embodied in other specific forms without departing from the spirit or essential characteristics thereof The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. An opto-isolator circuit for providing isolation between a bi-directional, I2C transmission line and a pair of single-direction transmission lines, comprising:

a bi-directional port for receiving data from, and providing data to, the bi-directional transmission line;

an output path, including (i) a first buffer for receiving outgoing data from the bi-directional port, (ii) a first opto-isolator for receiving the outgoing data from an output of the first buffer, and (iii) a second buffer for receiving the outgoing data from an output of the first opto-isolator and providing the outgoing data to an output port;

an input path, including (i) a third buffer for receiving incoming data from an input port, (ii) a second opto-isolator for receiving the incoming data from an output of the third buffer, and (iii) a fourth buffer for receiving the incoming data from an output of the second opto-isolator;

wherein the fourth buffer provides the incoming data to the bidirectional port such that characteristics of the incoming data are compatible with I2C characteristics.

2. An opto-isolator circuit according to claim 1, wherein the bi-directional port is at a voltage level corresponding to a logic high when a voltage level corresponding to a logic high is applied to the input port, and the bi-directional port is at a voltage level corresponding to a logic low when a voltage level corresponding to a logic low is applied to the input port.

3. An opto-isolator circuit according to claim 1, wherein the output port is at a voltage level corresponding to a logic high when a voltage level corresponding to a logic high is applied to the bi-directional port, and the output port is at a voltage level corresponding to a logic low when a voltage level corresponding to a logic low is applied to the bi-directional port.

4. An opto-isolator circuit according to claim 1, wherein the first buffer includes a tri-state buffer having (i) a high-impedance enable input electrically coupled to the bi-directional port, (ii) an output electrically coupled to the first opto-isolator, and (iii) an input electrically coupled to a reference voltage corresponding to a logic high state.

5. An opto-isolator circuit according to claim 1, wherein the second buffer includes a tri-state buffer constructed and arranged such that the output of the tri-state buffer is in a high-impedance state when the first opto-isolator presents a voltage corresponding to a logic high state to the input of the second buffer, and the output of the tri-state buffer is at a voltage level corresponding to a logic low state when the first opto-isolator presents a high impedance state to the input of the second buffer, and the output of the tri-state buffer is electrically coupled to the output port.

6. An opto-isolator circuit according to claim 1, wherein the third buffer includes a tri-state buffer having (i) a high-impedance enable input electrically coupled to the input port, (ii) an output electrically coupled to the second opto-isolator, and (iii) an input electrically coupled to a reference voltage corresponding to a logic high state.

7. An opto-isolator circuit according to claim 1, wherein the fourth buffer includes a tri-state buffer constructed and arranged such that the output of the tri-state buffer is at a voltage level corresponding to a logic high when the second opto-isolator presents a voltage corresponding to a logic high state to the input of the fourth buffer, and the output of the tri-state buffer is at a voltage level corresponding to a logic low state when the first opto-isolator presents a high impedance state to the input of the fourth buffer, and the output of the tri-state buffer is electrically coupled to the bidirectional port.

8. A method of providing isolation between a bi-directional, I2C transmission line and a pair of single-direction transmission lines, comprising:

providing a bi-directional port for receiving data from, and providing data to, the bi-directional transmission line;

providing an output path, including (i) a first buffer for receiving outgoing data from the bi-directional port, (ii) a first opto-isolator for receiving the outgoing data from an output of the first buffer, and (iii) a second buffer for receiving the outgoing data from an output of the first opto-isolator and providing the outgoing data to an output port;

providing an input path, including (i) a third buffer for receiving incoming data from an input port, (ii) a second opto-isolator for receiving the incoming data from an output of the third buffer, and (iii) a fourth buffer for receiving the incoming data from an output of the second opto-isolator, wherein the fourth buffer provides the incoming data to the bi-directional port such that characteristics of the incoming data are compatible with I2C characteristics.

\* \* \* \* \*